Dec. 15, 1970  V. V. VARNELA  3,547,541
SPECTROMETER APPARATUS FOR SEQUENTIALLY MEASURING
RATIOS OF SELECTED SPECTRAL INTENSITIES
Filed Oct. 30, 1968  2 Sheets-Sheet 1

Veijo V. Varnela,
INVENTOR.

BY

*David Mus*

ATTORNEY.

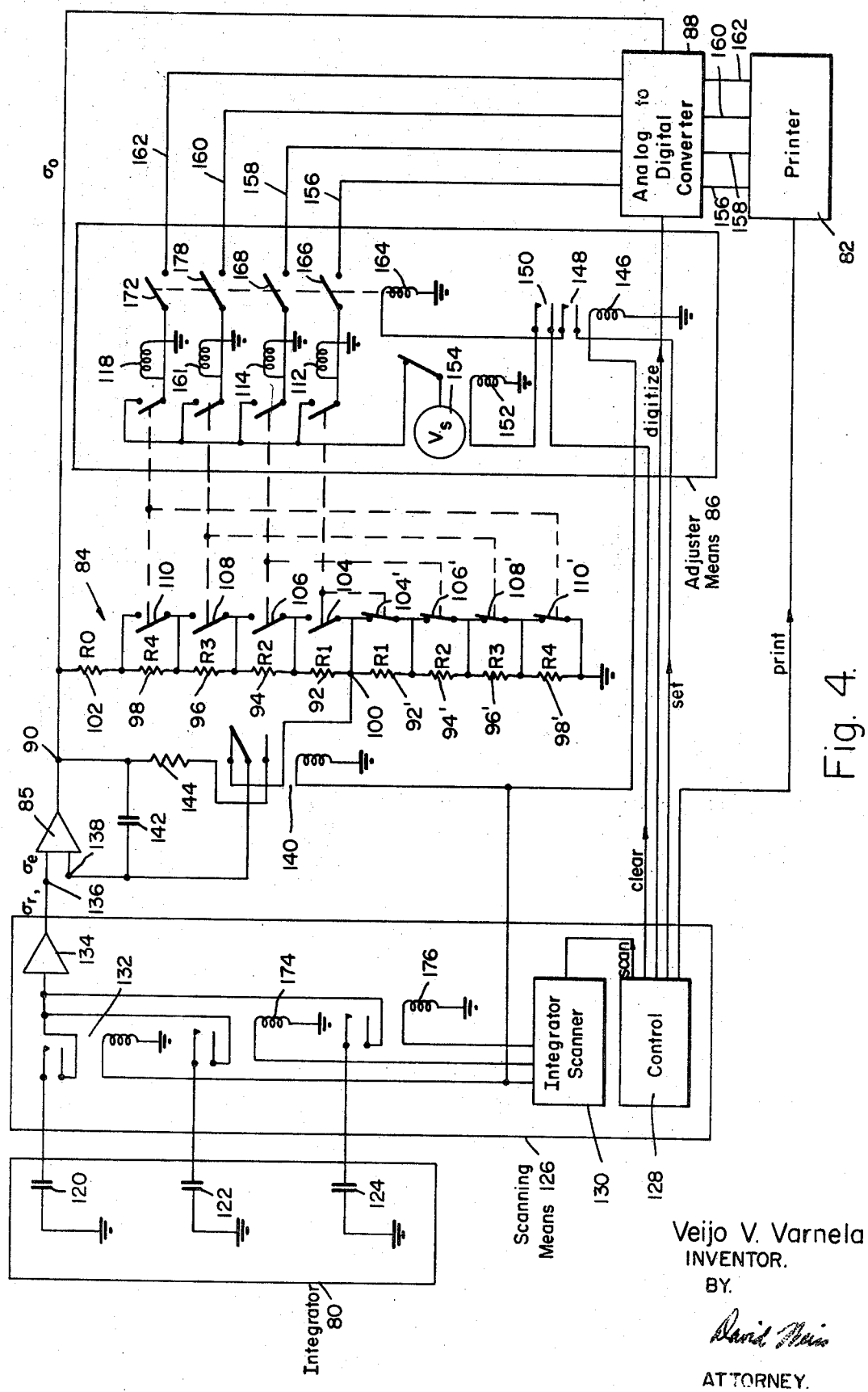

United States Patent Office 3,547,541
Patented Dec. 15, 1970

3,547,541
SPECTROMETER APPARATUS FOR SEQUENTIALLY MEASURING RATIOS OF SELECTED SPECTRAL INTENSITIES
Veijo V. Varnela, San Gabriel, Calif., assignor, by mesne assignments, to Angstrom, Inc., Chicago, Ill., a corporation of Illinois
Filed Oct. 30, 1968, Ser. No. 771,721
Int. Cl. G01j 3/30, 3/36
U.S. Cl. 356—81                               26 Claims

ABSTRACT OF THE DISCLOSURE

A direct-reading spectrometer for sequentially measuring ratios of selected spectral intensities at high readout rates. The apparatus utilizes "implicit division" techniques for producing output signals proportional to the linear ratios of any two integrator voltages, and the preferred embodiment thereof includes digitally controlled apparatus for providing ratio measurements at speeds and accuracies not obtainable with servo driven systems.

FIELD OF THE INVENTION

This invention relates to spectrometers, and more particularly to apparatus for determining relative intensities of particular components in a radiation spectrum.

Although the present invention is described herein with reference to a direct-reading emission spectrometer, the invention finds application in all types of analytical apparatus utilizing spectral techniques. For example, spectrometers for the analysis of bodies normally in an excited state, and spectrometers utilizing atomic absorption techniques, are included within the scope of the present invention.

INTRODUCTION

A typical analysis of a material by spectral techniques involves exciting the material to emit radiation, and quantitatively evaluating the radiation spectrum which characterizes the various elements contained in the material. The emitted radiation is dispersed into a spectrum having focused components or "spectral lines" arranged along a focal curve in order of their wavelengths. The presence of a spectral components at a specific location, therefore, indicates the presence of a particular element within the material, and the relative intensities of the radiant energy in the spectral components are measures of the relative concentrations of the indicated elements.

In order to compensate for compositional and structural variations in the material under analysis, and for instrument variations which simultaneously affect the intensities of all spectral components (e.g., excitation variations), it is normal practice to measure the intensity of each spectral component corresponding to elements of interest, and to compare these intensities with an intensity selected as a reference. The selection of a particular reference intensity is dependent upon the application. For example, in materials having a particular, known element always present in relatively high concentrations, a spectral component corresponding to that element is often selected. When the reference corresponds to a particular element in the material under analysis, it is usually referred to as an "internal standard". Alternatively, the reference can be the intensity of the total emitted radiation, the non-dispersed radiation, or a selected group of spectral components. As used herein, the selected reference will be referred to as a "reference component"; spectral components corresponding to elements whose relative concentrations are to be determined will be called "element components."

In one type of direct-reading spectrometer, the radiant energy of each spectral component is received by a respective photoelectric transducer such as a photomultiplier tube, during a common "excitation period," i.e., the time during which the material under analysis is being excited. The photomultipliers generate electric signals proportional to the intensities of the radiant energy in the spectral components. Because the intensity of the emitted radiation can fluctuate during the excitation period, it has been found practical to integrate the electrical signals from the photomultipliers over a period of time known as an "integration period."

Signal integration is generally accomplished by applying each of the photomultiplier outputs to respective integrator means such as capacitors, and charging the capacitors during the integration period. The ratio of the voltage across an element capacitor (i.e. a capacitor associated with an element spectral component) with respect to the voltage across a reference capacitor (i.e. a capacitor associated with a reference component) is proportional to the ratio of element to reference component intensities, generally referred to as an "intensity ratio." An integration period common to both an element capacitor and the reference capacitor should be utilized to provide a meaningful intensity ratio.

DESCRIPTION OF THE PRIOR ART

In one type of apparatus for providing ratio measurements between the element and reference components, the process of generating the ratio is performed by the integrator capacitors. In patents to Fisher et al. (U.S. Pat. No. 2,436,104) and to Hasler et al. (U.S. Pat. No. 2,675,734) for example, a "fixed level" scheme for attaining a common integration period simultaneously commences charging the reference and element capacitors from their respetcive photomultipliers, and simultaneously terminates the charging of all capacitors when a voltage across the reference capacitor has reached a predetermined level. The associated readout apparatus is controlled or calibrated in terms of the reference capacitor known voltage, so that after completion of the common integration period the voltages on the element capacitor can be read out as direct measures of the intensity ratios.

Greater versatility in spectrochemical analyses is provided when integrations are performed over a fixed time interval rather than over a variable time interval controlled by the voltage level of the reference capacitor. Apparatus for performing ratio-type comparisons of the amounts of charge integrated by the element capacitors with respect to the reference capacitors, is required for spectrometers using fixed time integration techniques.

Various schemes have appeared in the prior art for performing these ratio comparisons. In a patent to Saunderson (No. 2,577,814), for example, the integrator capacitors are discharged through respective resistors, and the difference in the respective times required for an element capacitor and the reference capacitor to discharge to a predetermined voltage level is recorded by a strip chart recorder. The length of the line traced on the moving chart paper is proportional to the logarithm of the intensity ratio, and therefore must be converted to a linear signal for permitting digital data processing.

Ratio measuring systems which provide linear representations of intensity ratios following a fixed time common integration period, are disclosed in patents to Peras (No. 2,918,606) and to Du Bois et al. (No. 3,298,275). In Peras, the reference capacitor voltage and an element capacitor voltage are applied to respective high impedance D.C. amplifiers, the outputs of which are applied to a recording potentiometer functioning as a "quotient meter." The high impedance amplifiers act as impedance matching devices between the high impedance integrating capacitors and the low impedance inputs to the recorder.

The Peras apparatus replaces the conventionally impressed constant voltage across the recording potentiometer with the reference amplifier output voltage. The element amplifier output voltage is applied as one input to a servo amplifier coupled to a servo motor which drives the potentiometer's wiper, while the wiper voltage is applied as the other input of the servo amplifier. When the position of the wiper is adjusted so that the voltages at the two inputs of the servo amplifier are equal, the servo motor stops and the position of the wiper is recorded as a linear measure of the intensity ratio. In order for the Peras apparatus to produce a voltage signal which is a measure of the intensity ratio, the system must be modified to convert the potentiometer setting to a voltage signal, for example by the addition of a followup potentiometer connected to a constant voltage supply.

It should be noted that, since the reference voltage must be applied to the potentiometer in order to produce an intensity ratio measurement, the reference capacitor is continually coupled to the recorder during sequential readout for an analysis involving a plurality of elements. This can produce charge losses from the reference capacitor during measurements, resulting in a system limitation that the ratios may be read out in the same order as their calibration.

In contrast to Peras, the patent to Du Bois et al. discloses apparatus requiring the performance of a two-step process in order to measure the intensity ratio, i.e., the reference and element voltages must be applied alternatively to the ratio apparatus.

The Du Bois et al. ratio measuring system utilizes a servo potentiometer (which includes a constant voltage source as the input voltage to a first potentiometer), and a servo driven variable voltage source (which includes a second potentiometer connected to the constant voltage source). The servo potentiometer is adjustable in response to an application of the reference capacitor voltage. After adjustment of the first potentiometer, its constant voltage source is replaced by the variable voltage source, and the second potentiometer is driven in response to an application of an element signal, until the servo amplifier is nulled. At this time, the voltage of the variable voltage source is proportional to the intensity ratio.

In both the Du Bois et al. and Peras systems, a different potentiometer position must be translated into a voltage for every element in order to generate voltage output ratio measurement, and a time interval must be allowed between successive measurements to permit nulling of the servo amplifier.

SUMMARY OF THE INVENTION

The disadvantages of the prior art spectrometers are eliminated by the combination according to the present invention. Ratio measuring apparatus is provided in combination with a spectrometer, which permits the utilization of fixed time integration techniques while generating a voltage output signal which is linearly proportional to be a mechanical adjustment of a potentiometer for each signals proportional to the intensity ratios. There must the intensity ratio. In contrast to Peras and Du Bois et al., there are no mechanical adjustments performed in response to an application of an element capacitor voltage, so that the present apparatus provides greater system reliability and increased speeds by which successive ratio measurements can be performed. In further contrast to Peras and Du Bois et al., the present system is adaptable for either one-step operation (simultaneous application of reference and element capacitor voltages) or two-step operation (alternative application of reference and element capacitor voltages).

The ratio measuring system of the spectrometer according to the present invention includes apparatus for electrically performing a division function upon two voltages, by a technique commonly referred to as "division by implicit computation" in the analog computer art.

Division of the voltages across an element capacitor and the reference capacitor is accomplished by connecting a multiplier circuit in the feedback path of a feedback amplifier, such as a differential operational amplifier. The reference capacitor voltage is applied to the multiplier circuit, and impresses a function analogous to that voltage in the amplifier feedback path. The voltage across an element capacitor is applied to an input terminal of the differential amplifier, and the multiplication provided in the amplifier feedback produces a voltage at the amplifier output terminal which is proportional to the ratio of the element and reference capacitor voltages.

The reference capacitor voltage is preferably applied to the multiplier circuit before the application of an element capacitor voltage to the amplifier input, the division being accomplished in a two-step process. Alternatively, an element capacitor voltage and the reference capacitor voltage can be applied simultaneously to the amplifier and to the multiplying circuit, respectively, so that the division may be accomplished in a one-step process if desired. In either case, however, additional element capacitor voltages can be applied sequentially to the amplifier input to obtain corresponding intensity ratios with respect to a particular reference capacitor voltage, without additional applications of the reference capacitor voltage to the multiplier circuit.

A preferred type of multiplier circuit includes a voltage divider such as a potentiometer in the amplifier feedback path, in addition to adjuster means responsive to an application of the reference capacitor voltage for adjusting the potentiometer. For a two-step process, means are provided for removing the potentiometer from the feedback path during potentiometer adjustment, and the reference capacitor signal is applied to an amplifier input. The adjuster means is temporarily connected to the amplifier output terminal, and responds to the application of the reference capacitor voltage by adjusting the potentiometer in a manner which effectively impresses the reference capacitor voltage as a denominator for the second step in the process.

During the second step, the potentiometer is reconnected into the amplifier feedback path, and the adjuster means is disconnected from the amplifier output terminal. The element capacitor voltages are thereafter sequentially applied to the amplifier input terminal, and voltages proportional to the respective intensity ratios are provided at the amplifier output terminal.

During an analysis, the voltage on a reference capacitor is measured only once and thereafter the voltages for any number of element capacitors can be measured with respect to the reference. Charge losses occur only once for both reference and element, and therefore do not materially affect the intensity ratio permitting the ratios to be read out in any order.

In a preferred embodiment of the ratio measuring apparatus according to the present invention, a digitally controlled potentiometer is utilized, such as disclosed in M. R. Karaksy, "Automatic Digitally Controlled Coefficient Setting Potentiometer," Control, April 1966, pp. 178–80. The preferred embodiment therefore includes analog-to-digital converter means connected between the amplifier output terminal and the potentiometer adjuster means. Accordingly, the intensity ratios are available in digital form.

The present ratio measuring apparatus permits complete freedom of selection among integrator capacitors. The voltage on any element capacitor can be ratioed to the voltage of any other capacitor used as a reference, so that multiple references (including multiple internal standards) can be utilized in a single analysis.

Furthermore, since the present apparatus functions to "divide" two electrical signals for measuring intensity ratios, different element groups can be analyzed over different integration periods (the integration period for each group of course being common to all elements in that group). The present system does not limit the type of program which can be applied to the integrators, so that different elements can be integrated at different times during the excitation cycle.

The novel features which are believed to be characteristic of the invention, together with further advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 4 is a circuit diagram showing a third or preferred embodiment of intensity ratio measuring system according to the present invention.

Figure 1:
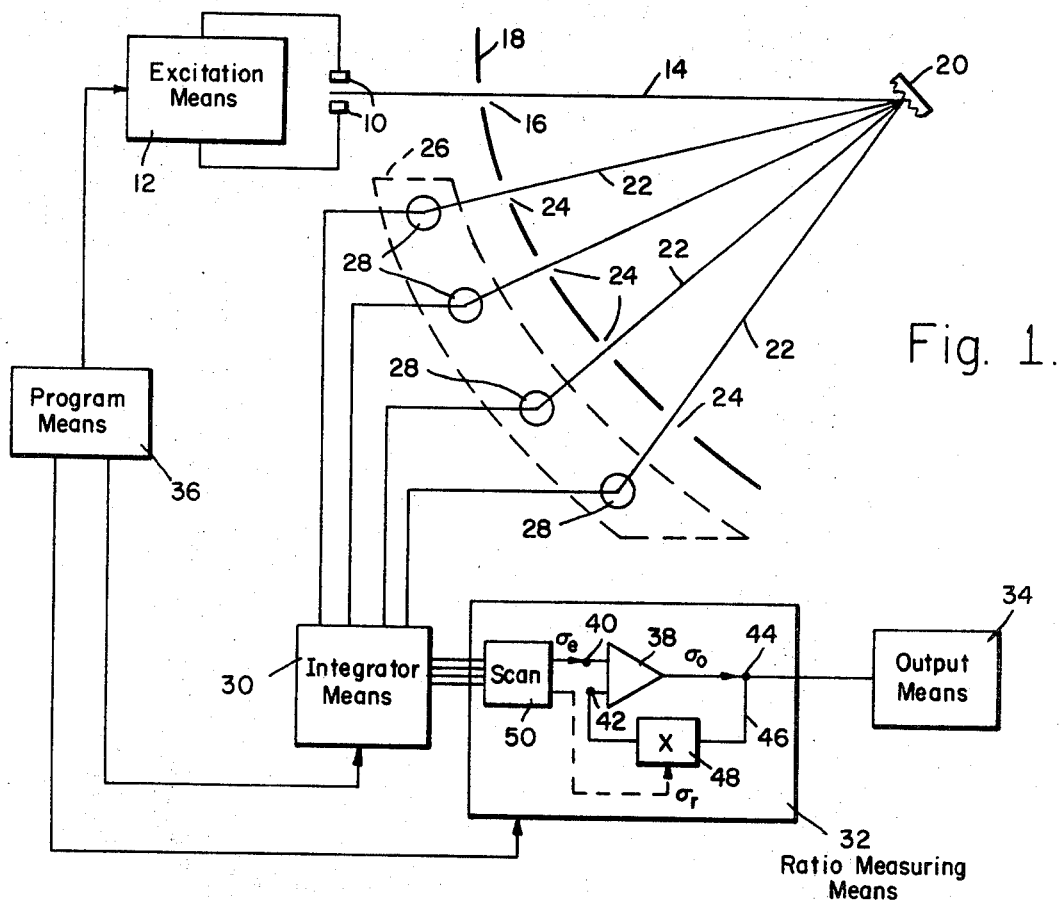
FIG. 1 is a block diagram of a direct-reading emission spectrometer including a first embodiment of an intensity ratio measuring system according to the present invention.

Turning first to FIG. 1, the material to be analyzed is electrically excited into emitting radiation by connecting a pair of electrodes 10 (at least one of which comprises a sample of the material) to an excitation source 12, such as a high voltage power or arc source. During the resulting excitation period, emitted radiation 14 is directed through an entrance slit 16 within a mask 18, to a spectrum dispersing means such as a diffraction grating 20. The received radiation is dispersed into a plurality of rays 22 which form images of the entrance slit 16 (or "spectral lines") along a focal curve which can coincide with the mask 18. The position of each spectral line is dependent upon the wavelength of a corresponding diffracted ray 22, and exit slits 24 are positioned in the mask 18 at locations which permit the radiation associated with respective spectral lines or components to be received by photoelectric transducer means 26 such as a plurality of correspondingly positioned photomultipliers 28.

Although only four dispersed rays 22 and four corresponding photomultipliers 28 are shown in the drawing, it should be noted that in any analysis the number of rays 22 (and hence the number of spectral components) will be equal to the number of elements excited to emit radiation in the sample. In principle, any one or combination of these spectral components can be selected as a reference.

The outputs of each of the photomultipliers 28 are coupled to an integrator means 30 for individually integrating the photocurrents from all (or a selected number) of respective photomultipliers 28 over a common integration period, preferably controlled by fixed-time techniques. At least one reference is included in each common integration period, after which reference signals $\sigma_r$ and element signals $\sigma_e$, representing corresponding integrated photocurrents are available for application to the ratio measuring means 32.

The ratio measuring means 32 sequentially "divides" each of the element signals $\sigma_e$ by a reference signal $\sigma_r$ for generating output signals $\sigma_o$ proportional to the ratios of the intensities of respective element spectral components to a reference spectral component. The ratio signals $\sigma_o$ can be applied to an output means 34, such as means for providing a visible indication of the ratios, means for data storage, printout means, or data processing means.

Program means 36 are provided for controlling the sequence of spectrometer operations in accordance with a predetermined program, and the program means 36 is accordingly coupled to the excitation source 12, the integrator means 30, and the ratio measuring means 32, for supplying appropriate, timed command signals thereto.

The ratio measuring means 32 includes feedback amplifier means having a high "open loop" gain, such as a differential operational amplifier 38 of conventional design, preferably in the non-inverting configuration. The differential amplifier 38 includes a first input terminal 40, a second input terminal 42 and an output terminal 44. A feedback path 46 is provided between the output terminal 44 and the second input terminal 42. Multiplier means 48 (for examples, a servo multiplier or an electronic multiplier, each of which is well known in the analog computer art) is connected in the feedback path 46 of the differential amplifier 38. The multiplier means 48 is responsive to an application of a reference signal $\sigma_r$ in such manner that, when an element signal $\sigma_e$ is applied to the first input terminal 40, the amount of output signal fed back to the second input terminal 42 modifies the output signal $\sigma_o$ at the amplifier output terminal 44 to be proportional to the ratio of the magnitudes of the element signal $\sigma_e$ to the reference signal $\sigma_r$.

Scanning means 50 coupling the amplifier-multiplier combination 38, 48 to the integrator means 30, is provided for applying a reference signal $\sigma_r$ from the integrator means 30 to the multiplier means 48, and for applying an element signal $\sigma_e$ from the integrator means 30 to the amplifier first input terminal 40. If the input impedance of the amplifier 38 is not sufficiently high in relation to the readout speed, the scanning means 50 should include impedance matching means such as a high impedance amplifier (not shown), coupling the high impedance integrator means 30 with the amplifier-multiplier combination 38, 48.

In operation, the scanning means 50 applies the reference signal $\sigma_r$ to the multiplier means 48. When an element signal $\sigma_e$ is applied to the amplifier first input terminal 40, the presence of the multiplier means 48 in the feedback path 46 forces the amplifier output signal $\sigma_o$ to adjust its value until the feedback voltage applied to the amplifier second terminal 42 is the same as the voltage at the amplifier first input terminal 40. Since the feedback voltage is proportional to the product of the amplifier output signal $\sigma_o$ and the reference signal $\sigma_r$, and at the same time it is equal to the element signal $\sigma_e$, it follows that the amplifier output signal $\sigma_o$ is proportional to the ratio of the element signal $\sigma_e$ to the reference signal $\sigma_r$.

Although the reference signal $\sigma_r$ and the element signal $\sigma_e$ can be applied simultaneously to the amplifier-multiplier combination 38, 48, it is preferred that the multiplier means 48 be initially set by an application of the reference signal $\sigma_r$, and thereafter an element signal $\sigma_e$ applied to the amplifier 38 for measuring the intensity ratio. This preferred two-step operation permits a simplification of the scanning means 50, in that separate impedance matching means for the reference signal $\sigma_r$ is not required.

For either one-step or two-step operation, however, after the multiplier means 48 is initially set by an application of the reference signal $\sigma_r$, the scanning means 50 sequentially applies the remaining element signals $\sigma_e$ to the amplifier 38, permitting sequential readout of the amplifier output signals $\sigma_o$ corresponding to the intensities of the various element spectral components with respect to a particular reference such as an internal standard.

If desired, the multiplier means 48 can be reset by an application of a different reference signal $\sigma_r$ corresponding to a different internal standard, and element signals $\sigma_e$ can be sequentially applied to the amplifier 38 for providing intensity ratios related to the different internal standard. Furthermore, intensity ratios may be measured with respect to the same internal standard, integrated over different integration periods (each common to a corresponding integration time of particular element components) for measuring intensity ratios over the most meaningful portions of the various element evolution curves. In these respects, the versatility of the ratio measuring means 32 of the present invention is limited only by the capabilities of the other spectrometer components, particularly the integrator means 30.

Figure 2:
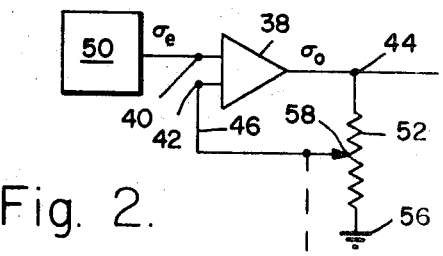
FIG. 2 is a circuit diagram showing an implementation of the first embodiment of the ratio measuring system of FIG. 1.

The multiplier means 48 can be implemented as shown in FIG. 2, which includes an adjustable voltage divider such as a potentiometer 52 connected in the amplifier feedback path 46, and adjuster means 54 for setting the potentiometer 52. Similar reference numerals are used in FIG. 2 for indicating components corresponding to those shown in FIG. 1.

The feedback potentiometer 52 has a first end connected to the amplifier output terminal 44, and a second end connected to a constant common potential such as ground, indicated by a conventional ground symbol 56. Position of a potentiometer arm or junction terminal 58 is adjustable between the ends of the potentiometer 52, and the junction terminal 58 is connected to the amplifier second input terminal 42.

The adjuster means 54 is responsive to an application of the reference signal $\sigma_r$, for adjusting the position of the junction terminal 58 at a potentiometer setting analogous to the reference signal voltage $\sigma_r$. That is, $$\frac{R_1}{R_T} = k\sigma_r$$

where $R_T$ is the total resistance of the potentiometer 52, $R_1$ is the resistance between the junction 58 and ground, and $k$ is a constant. An application of an element signal $\sigma_e$ to the amplifier first terminal 40, thereupon causes the output signal $\sigma_o$ to adjust until the voltages at the input terminals 40, 42 are equal, that is $$\frac{R_1}{R_T} \sigma_o = \sigma_e$$

Substituting for the potentiometer setting, $$\sigma_o = k \frac{\sigma_e}{\sigma_r}$$

The potentiometer adjuster means 54 can be comprised of conventional circuitry. For example, a servo-potentiometer circuit can be utilized, including a conventional servo-amplifier 60 driving a servo-motor 62 coupled to an arm 64 of a secondary potentiometer 66. The secondary potentiometer 66 is connected across a reference voltage source 68 having a constant voltage V, and the secondary potentiometer arm 64 is electrically connected to one input of the servo-amplifier 60. When the internal standard signal $\sigma_s$ is applied to the other input of the servo amplifier 60, the servo motor 62 drives the secondary potentiometer arm 64 until the servo-amplifier 60 nulls. The secondary potentiometer 66 is similar to the feedback potentiometer 52, so that when the servo-amplifier 60 nulls, $$\frac{R_1}{R_T} = \frac{\sigma_r}{V} = k\sigma_r$$

In addition to driving the secondary potentiometer arm 64, the servo motor 62 correspondingly drives the arm or junction terminal 58 of the feedback potentiometer 52, so that the feedback potentiometer 52 is adjusted to the same setting as the secondary potentiometer 66. That is, the setting of the feedback potentiometer 52 is $$\frac{R_1}{R_T} = k\sigma_r$$

Although apparatus using voltage feedback has been described, current feedback apparatus can nevertheless be utilized and is included within the scope of the present invention.

Figure 3:
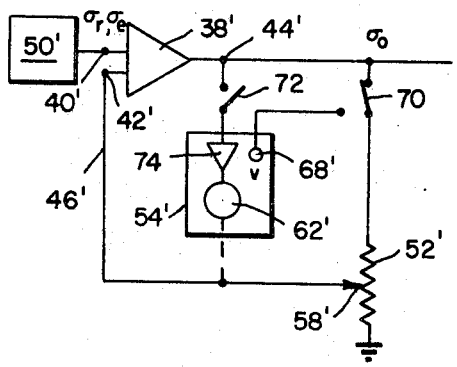
FIG. 3 is a circuit diagram showing a second embodiment of the ratio measuring system of the present invention.

Turning next to FIG. 3, the second embodiment of the intensity ratio measuring means of the present invention permits a reference signal $\sigma_r$ to be applied directly to the amplifier first input terminal 40' for setting the multiplier means. Primed reference numerals are utilized in FIG. 3 to indicate components similar to those of FIG. 2.

As indicated in FIG. 2, the multiplier means can be implemented by a voltage divider element such as a potentiometer 52' normally in the feedback path 46', and potentiometer adjuster means 54' for adjusting position of the potentiometer junction terminal 58' in accordance with an application of the reference signals $\sigma_r$. First switch means 70 is provided between the ungrounded end of the potentiometer 52' and the amplifier output terminal 44', for connecting the potentiometer 52' to a constant voltage source 68' during potentiometer adjustment. The potentiometer adjuster means 54' is connected to the amplifier output terminal 44' by means of a second switch means 72 only during setting of the potentiometer 52'.

One example of a suitable potentiometer adjuster means 54' is shown in FIG. 3, including a booster amplifier 74 connected to a servo-motor 62' for driving the potentiometer junction terminal 58', and further includes the constant voltage source 68' having a voltage V.

In operation, the scanning means 50' controls the first switch 70 to open with respect to the amplifier output terminal 44' and to close to the constant voltage source 68', and further controls the second switch 72' to close to the amplifier output terminal 44'. The scanning means 50' applies the reference signal $\sigma_r$ to the differential amplifier first input terminal 40'. The apparatus therefore operates as a servo-potentiometer, the servo-motor 62' adjusting the position of the potentiometer junction terminal 58' until the differential amplifier 38' nulls. When this occurs, the setting of the potentiometer 52' is proportional to the reference signal $\sigma_r$.

The scanning means 50' thereupon controls the first switch 70 to close to the differential amplifier output terminal 44' and the second switch 72 to open. The reference signal $\sigma_r$ is removed from the differential amplifier first terminal 40', and is replaced by an element signal $\sigma_e$. The resulting output signal $\sigma_o$ is proportional to the ratio of the applied element signal $\sigma_e$ to the reference signal $\sigma_r$, in accordance with the calculations developed above. The remaining element signals $\sigma_e$ are sequentially applied to the first input terminal 40'.

The third embodiment of ratio measuring apparatus according to the present invention, shown in FIG. 4 in combination with integrator means 80 and output means such as a printer 82, utilizes a digitally controlled adjustable voltage divider such as a digitally controlled potentiometer 84 normally in the feedback path of a feedback amplifier such as a differential amplifier 85. The potentiometer 84 is set by a potentiometer adjuster means 86 actuated by an analog-to-digital converter 88, such as a digital voltmeter, connected to an amplifier output terminal 90.

One example of the digitally controlled potentiometer 84 includes a first plurality of series connected "bit" resistors, for example four bit resistors 92, 94, 96, 98 having resistances $R_1$, $R_2$, $R_3$, $R_4$, respectively. A second plurality of corresponding bit resistors, for example four bit resistors 92', 94', 96', 98' having resistances $R_1$, $R_2$, $R_3$ and $R_4$, respectively, is included in the potentiometer 84 and is connected to the first plurality at a potentiometer junction terminal 100.

The number and resistance values of the bit resistors in each plurality are selected in accordance with a binary code and the number of decades desired. For example, for a 1-2-2-4 code and a one decade measuring system, four bit resistors should be included in each plurality and resistance values can be $R_1 = 1$ kilo-ohm, $R_2 = 2$ kilo-ohms, $R_3 = 2$ kilo-ohms, and $R_4 = 4$ kilo-ohms.

The resolution of the measuring system can be increased from the ten percent resolution of a one decade system, by including additional decades in the potentiometer 84. For a 1-2-2-4 code, the includsion of four additional bit resistors in each plurality (having resistances, for example, of 100, 200, 200, and 400 ohms) increases the system resolution to one percent. Similarly, a three decade digitally controlled potentiometer would further increase the resolution to 0.1 percent, and a four decade system to 0.01 percent.

For the resistance values originally indicated in the first decade for purposes of example, the total resistance of the potentiometer more closely approaches 10 kiloohms with the number of decades included in the potentiometer. In order to adjust the total resistance of the potentiometer to a full scale value which provides better proportionality in the measurement system, the potentiometer 84 can include an additional resistor 102 having a resistance $R_0$ which is equal to the value of the smallest-valued bit resistor in the potentiometer. In the one decade system shown as an example, $R_0=R_1$.

Each of the bit resistors in the potentiometer 84 includes respective shorting means, such as a first plurality of shorting switches 104, 106, 108, 110 respectively corresponding to the first plurality bit resistors 92, 94, 96, 98, and a second plurality of shorting switches 104', 106', 108', 110' respectively corresponding to the second plurality of bit resistors 92', 94', 96', 98'. When the potentiometer 84 is in a "cleared" condition, the first plurality switches are each in an open configuration while the second plurality switches are each in a closed or shorting configuration.

The potentiometer 84 is set by controlling the configurations of various pairs of the shorting switches, each pair including one switch from each plurality. For example, a first switch pair includes normally open switch 104 and normally closed switch 104', and switch 104 is caused to close and switch 104' to open upon energization of a first bit relay coil 112 included in the potentiometer adjusted means 86. Similarly, a second bit relay coil 114 controls operation of a second shorting switch pair 106, 106', and third and fourth bit relay coils 116, 118 respectively control operation of corresponding shorting switch pairs.

The intensity ratio measuring system of FIG. 4 is operated in the following manner. After a reference capacitor 120 and at least one element capacitor (such as a first element capacitor 122 and a second element capacitor 124) have been charged over a common integration period, the spectrometer program means 36 (see FIG. 1) commands scanning means 126 to function. Control means 128 is programmed to control the operation of the various components in the measuring system. Upon actuation of the scanning means 126, the control means 128 transmits a SCAN command to an integrator scanner 130, which in turn energizes a first scan relay 132 to connect the reference capacitor 120 to a high impedance amplifier 134. Although the high impedance amplifier 134 is preferred in the circuit (for impedance matching), it is not a requirement of the circuit, and its inclusion should be determined by the overall accuracy of the system with respect to permissible errors due to capacitor charge losses during measurement. For a high accuracy measuring system, however, the high impedance amplifier 134 should be included as shown.

The first actuation of the integrator scanner 130, therefore, causes the reference signal $\sigma_r$ to be applied to a first input terminal 136 of the differential amplifier 85.

The potentiometer junction terminal 100 is normally connected to a second input terminal 138 of the differential amplifier 85. At the same time the reference signal $\sigma_r$ is applied to the differential amplifier 85, the integrator scanner 130 actuates an amplifier relay 140 which disconnects the potentiometer junction terminal 100 from the amplifier second input terminal 138 while connecting that terminal to the amplifier output terminal 90. The differential amplifier 85 will therefore function as a unity-gain positive follower, and the output signal $\sigma_o$ will be equal to the reference signal $\sigma_r$, which is applied to the analog-to-digital converter 88.

A feedback capacitor 142 can be connected across the amplifier output terminal 90 and second input terminal 138, for amplifier stabilization during the switching of the amplifier relay 140. This prevents the amplifier from saturating during the switching transition, which would decrease the measurement rate. A feedback resistor 144 protects the contacts of the amplifier relay 140 by attenuating the discharge current surge from the feedback capacitor 142 following the transition. If amplifier stabilization is not a problem, however, the feedback capacitor 142 and resistor 144 would not be included in the circuit.

During this same step of the integrator scanner 130, a setting relay coil 146 is energized to close a first setting contact pair 148 and a second setting contact pair 150.

After the first scan step has been completed, the control means 128 generates a CLEAR output which is transmitted through the closed second contact pair 150 to actuate a clear relay 152, removing a holding supply voltage $V_s$ (provided by a voltage source 154) from the coils of the bit relays 112, 114, 116, 118. This releases any of the bit relays which might have been previously energized by the converter 88 (and held energized by the holding supply voltage $V_s$). All of the first plurality shorting switches 104, 106, 108, 110 are therefore in an open configuration, while all of the second plurality shorting switches 104', 106', 108', 110' are in their closed or shorting configurations.

When the CLEAR output is removed, the clear relay 152 is released and the holding supply voltage $V_s$ is made available to "latch" the bit relays 112, 114, 116, 118 through latching contacts 113, 115, 117, 119. At the same time, a DIGITIZE command is applied to the analog-to-digital converter 88, and the converter 88 thereupon operates to digitize the value of the reference signal $\sigma_r$ applied to the converter input.

After digitization of the reference signal $\sigma_r$ has been completed and its digital value appears in the form of voltages on converter output or bit lines 156, 158, 160, 162 (or serially at a single converter output), the DIGITIZE command from the control means 128 is replaced by a SET output which energizes a third setting relay coil 164. This closes line contacts 166, 168, 170, 172, connecting the bit lines to the bit relays. Any of the bit relays 112, 114, 116, 118 which are connected to activated bit lines will be energized, and will remain energized by connection to the holding voltage source 154. Accordingly, the corresponding pairs of shorting switches in the potentiometer 84 will be actuated, setting the potentiometer in such manner that the digital value of the reference signal $\sigma_r$ is represented by the potentiometer configuration.

When the SET command is removed, the third setting relay coil 164 is deenergized, which disconnects the bit lines 156, 158, 160, 162 from the bit relays 166, 168, 170, 172, preventing any further adjustment of the potentiometer 84 regardless of further conversions by the analog-to-digital converter 88.

A PRINT command is thereupon applied to the printer 82, which is connected to the bit lines 156, 158, 160, 162, thereby recording the digital value of the amplifier output signal $\sigma_o$. If desired, analog printout can be provided by coupling a recorder (not shown) to the differential amplifier output terminal 90.

After printout, the control means 128 goes through another cycle, beginning with the SCAN command to the integrator scanner 130. The integrator scanner 130 advances one step, releasing the first scanner relay 132 and energizing a second scanner relay 174. Accordingly, the reference signal $\sigma_r$ is removed from the differential amplifier first input 136 and is replaced by an element signal $\sigma_e$ from the first element capacitor 122. At the same time, the amplifier relay 140 and the first setting relay coil 146 are released. This connects the potentiometer 84 into the feedback path of the differential amplifier 85, and opens the first and second contact pairs 148, 150 which causes the setting means 86 to be non-responsive to CLEAR and SET commands from the control means 128.

The control means 128 thereupon proceeds through the remainder of its cycle, and the differential amplifier output signal $\sigma_o$ is proportional to the ratio of the element signal $\sigma_e$ to the internal standard signal $\sigma_r$, as previously explained.

The control means 128 can then proceed through a third cycle, the integrator scanner 130 energizing a third scanner relay 176. The number of cycles is dependent upon the number of element ratio measurements required, with respect to the particular reference value stored in the potentiometer 84.

It should be noted that the reference signal $\sigma_r$ need not be measured by the differential amplifier 85 in its unity gain configuration. Instead, the reference signal $\sigma_r$ can be applied directly to the analog-to-digital converter 88, by-passing the differential amplifier 85 by means of a suitable switch. In this case, the amplifier second input terminal 138 would be permanently connected to the potentiometer junction terminal 100. The configuration shown in FIG. 4 is preferred, however, in that by measuring the reference signal $\sigma_r$ through the amplifier 85, any error due to residual offset voltage or current will be introduced into the measurements of both the element and reference signals $\sigma_e$, $\sigma_r$ and will tend to be canceled out in the ratio.

Of course, most of the relays shown in FIG. 4 can be replaced by solid state switching devices, and different scanning apparatus and programs can be utilized.

Thus, there has been shown several embodiments of ratio measuring apparatus in combination with a spectrometer, for measuring ratios between the intensities of spectral components. Modifications of the embodiments herein presented may be developed without departing from the essential characteristics thereof. Similarly, the ratio-measuring system can be utilized in combination with a spectrometer in applications other than the measurement of intensity ratios, such as for automatic standardization.

Accordingly, the invention should be limited only by the scope of the claims listed below.

What is claimed is:

1. In a spectrometer for the analysis of characteristic radiation of a material, the combination comprising:
   transducer means for generating electrical signals respectively corresponding to intensities of a reference component and an element component of the radiation;
   integrator means for integrating the electrical signals over a common time period and for providing voltage signals including a reference signal analogous to the integrated intensity of the reference component and an element signal analogous to the integrated intensity of the element component;
   feedback amplifier means having first and second input terminals and an output terminal, and including a feedback path between said output terminal and said second input terminal, for producing an output signal at said output terminal when a voltage signal is applied to said first input terminal;
   means coupling said amplifier means and said integrator means for applying the element signal to said first input terminal;
   multiplier means in said feedback path responsive to an application of the reference signal for modifying the output signal to be proportional to the ratio of the element signal to the reference signal when the element signal is applied to said first input terminal; and
   means coupling said multiplier means and said integrator means for providing said application.

2. The apparatus according to claim 1, above, wherein said feedback amplifier means is a differential amplifier.

3. The apparatus according to claim 1, above, wherein said multiplier means includes:
   adjustable voltage divider means in said feedback path; and
   adjuster means coupled to said voltage divider means and responsive to said application for adjusting said voltage divider means to a setting corresponding to the reference signal.

4. The apparatus according to claim 1, above, wherein said multiplier means includes:
   a potentiometer in said feedback path; and
   adjuster means coupled to said potentiometer and responsive to said application for adjusting said potentiometer to a setting corresponding to the reference signal.

5. The apparatus according to claim 1, above, wherein said multiplier means includes:
   a potentiometer having a first end connected to said output terminal, a second end at a constant common potential, and a junction terminal adjustable between said first and second ends, said junction terminal connected to said second input terminal; and
   adjuster means coupled to said junction terminal and responsive to said application for adjusting position of said junction terminal to a potentiometer setting corresponding to the reference signal.

6. In a spectrometer for the analysis of characteristic radiation of a material, the combination comprising:
   transducer means for generating electrical signals respectively corresponding to intensities of a reference component and an element component of the radiation;
   integrator means for integrating the electrical signals over a common time period and for providing voltage signals including a reference signal analogous to the integrated intensity of the reference component and an element signal analogous to the integrated intensity of the element component;
   feedback amplifier means having first and second input terminals and an output terminal, and including a feedback path between said output terminal and said second input terminal, for producing an output signal at said output terminal when a voltage signal is applied to said first input terminal;
   means coupling said amplifier means and said integrator means for applying the reference signal and the element signal alternatively to said first input terminal;
   multiplier means normally connected in said feedback path adjustably responsive to an application of the reference signal to said first input terminal when said multiplier means is disconnected from said feedback path, for modifying the output signal to be proportional to the ratio of the element signal to the reference signal when the element signal is applied to said first input terminal; and
   means for disconnecting said multiplier means from said feedback path.

7. The apparatus according to claim 6, above, wherein said feedback amplifier means is a differential amplifier.

8. The apparatus according to claim 6, above, wherein said multiplier means includes:
   adjustable voltage divider means normally connected in said feedback path; and
   adjuster means responsive to said application of the reference signal and coupled to said voltage divider means for adjusting said voltage divider means to a setting corresponding to the reference signal.

9. The apparatus according to claim 6, above, wherein said multiplier means includes:
   a potentiometer normally connected in said feedback path; and
   adjuster means responsive to said application of the reference signal and coupled to said potentiometer, for adjusting said potentiometer to a setting corresponding to the reference signal.

10. The apparatus according to claim 6, above, wherein said multiplier means includes:
a potentiometer having a first end connected to said output terminal, a second end at a constant common potential, and a junction terminal adjustable between said first and second ends, said junction terminal connected to said second input terminal; and
adjuster means responsive to said application of the reference signal and coupled to said junction terminal, for adjusting position of said junction terminal to a potentiometer setting corresponding to the reference signal.

11. The apparatus according to claim 10, above, wherein said means for disconnecting said multiplier means from said feedback path includes means for disconnecting said amplifier second input terminal from said potentiometer junction terminal and connecting said output terminal to said second input terminal.

12. In a spectrometer for the analysis of characteristic radiation of a material, the combination comprising:
transducer means for generating electrical signals respectively corresponding to intensities of a reference component and an element component of the radiation;
integrator means for integrating the electrical signals over a common time period and for providing voltage signals including a reference signal analogous to the integrated intensity of the reference component and an element signal analogous to the integrated intensity of the element component;
feedback amplifier means having first and second input terminals and an output terminal, and including a feedback path between said output terminal and said second input terminal, for producing an output signal at said output terminal when a voltage signal is applied to said first input terminal;
means coupling said amplifier means and said integrator means for applying the reference signal and the element signal alternatively to said first input terminal; and
multiplier means in said feedback path adjustably responsive to an application of the reference signal to said first input terminal for modifying the output signal to be proportional to the ratio of the element signal to the reference signal when the element signal is applied to said first input terminal.

13. The apparatus according to claim 12, above, wherein said feedback amplifier means is a differential amplifier; said multiplier means includes:
a potentiometer having a first end normally connected to said output terminal, a second end at a constant potential, and a junction terminal adjustable between said first and second ends, said junction terminal electrically connected to said second input terminal,
motor means coupled to said junction terminal for adjusting position of said junction terminal, and
a constant voltage source;
and further including first switch means for disconnecting said potentiometer first end from said output terminal and connecting said first end to said source during times when the reference signal is applied to said first terminal, and second switch means for connecting said motor means to said output terminal for being driven by an error signal produced at said output terminal when the reference signal is applied to said first input terminal.

14. In a spectrometer for the analysis of characteristic radiation of a material, the combination comprising:
transducer means for generating electrical signals respectively corresponding to intensities of a reference component and an element component of the radiation;
integrator means for integrating the electrical signals over a common time period and for providing voltage signals including a reference signal analogous to the integrated intensity of the reference component and an element signal analogous to the integrated intensity of the element component;
feedback amplifier means having first and second input terminals and an output terminal, and including a feedback path between said output terminal and said second input terminal, for producing an output signal at said output terminal when the element signal is applied to said first input terminal;
analog-to-digital converter means for providing a digital representation of the reference signal when the reference signal is applied to said converter means;
means coupling said integrator means and said converter means for applying the reference signal to said converter means;
means coupling said integrator means and said amplifier means for applying the element signal to said first input terminal;
digitally controllable means in said feedback path controllably responsive to an application of the digital representation of the reference signal for modifying the output signal to be proportional to the ratio of the element signal to the reference signal when the element signal is applied to said first input terminal; and
means coupling said converter means and said digitally controllable means for providing said application.

15. The apparatus according to claim 14, above, wherein said converter means is normally connected to said output terminal for providing a digital representation of the output signal, and further including means for disconnecting said output terminal from said converter means during times when the reference signal is applied to said converter means.

16. The apparatus according to claim 14, above, wherein said digitally controllable means includes:
adjustable voltage divider means in said feedback path; and
means coupled to said voltage divider means and responsive to said application, for controlling said voltage divider means to adjust to a setting corresponding to the reference signal.

17. The apparatus according to claim 14, above, wherein said digitally controllable means includes:
a digitally controllable potentiometer in said feedback path; and
means coupled to said potentiometer and responsive to said application, for controlling said potentiometer to adjust to a setting corresponding to the reference signal.

18. In a spectrometer for the analysis of characteristic radiation of a material, the combination comprising:
transducer means for generating electrical signals respectively corresponding to intensities of a reference component and an element component of the radiation;
integrator means for integrating the electrical signals over a common time period and for providing voltage signals including a reference signal analogous to the integrated intensity of the reference component and an element signal analogous to the integrated intensity of the element component;
feedback amplifier means having first and second input terminals and an output terminal, and including a feedback path between said output terminal and said second input terminal, for producing an output signal at said output terminal when a voltage signal is applied to said first input terminal;
means coupling said amplifier means and said integrator means for applying the reference signal and the element signal alternatively to said first input terminal;
analog-to-digital converter means connected to said output terminal for providing a digital representation of the output signal;

digitally controllable means normally connected in said feedback path controllably responsive to an application of the digital representation of the output signal when said digitally controllable means is disconnected from said feedback path, for modifying the output signal to be proportional to the ratio of the element signal to the reference signal when the element signal is applied to said first input terminal;

means for disconnecting said digitally controllable means from said feedback path; and means coupling said converter means and said digitally controllable means for providing said application.

19. The apparatus according to claim 18, above, wherein said digitally controllable means includes:

adjustable voltage divider means normally connected in said feedback path; and means coupled to said voltage divider means and responsive to said application, for controlling said voltage divider means to adjust to a setting corresponding to the reference signal.

20. The apparatus according to claim 18, above, wherein said digitally controllable means includes:

a digitally controllable potentiometer normally connected in said feedback path; and means coupled to said potentiometer and responsive to said application, for controlling said potentiometer to adjust to a setting corresponding to the reference signal.

21. In a spectrometer for the analysis of characteristic radiation of a material, the combination comprising:

transducer means for generating electrical signals respectively corresponding to intensities of a reference component and an element component of the radiation;

integrator means for integrating the electrical signals over a common time period and for providing voltage signals including a reference signal analogous to the integrated intensity of the reference component and an element signal analogous to the integrated intensity of the element component;

feedback amplifier means having first and second input terminals and an output terminal, and including a feedback path between said output terminal and said input terminal, for producing an output signal at said output terminal when a voltage signal is applied to said first input terminal;

means coupling said amplifier means and said integrator means for applying the reference signal and the element signal alternatively to said first input terminal;

analog-to-digital converter means connected to said output terminal for providing a digital representation of the output signal;

a digitally controllable potentiometer normally connected in said feedback path;

means for disconnecting said digitally controllable potentiometer from said feedback path; and potentiometer adjuster means connected to said converter means for responsively receiving said digital representation to adjust said potentiometer when said potentiometer is disconnected from said feedback path.

22. The apparatus according to claim 21, above, wherein said feedback amplifier means is a differential amplifier.

23. The apparatus according to claim 21, above, further including output means connected to said converter means.

24. The apparatus according to claim 21, above, further including printer means connected to said converter means for printing a visible indication of said digital representation.

25. In a spectrometer for the analysis of characteristic radiation of a material, the combination comprising:

signal generator means for generating at least two electrical signals analogous to distinct characteristics of the radiation;

feedback amplifier means having first and second input terminals and an output terminal, and including a feedback path between said output terminal and said second input terminal, for producing an output signal at said output terminal when one of the electrical signals is applied to said first input terminal;

means coupling said amplifier means and said generator means for applying a first one of the electrical signals to said first input terminal;

multiplier means in said feedback path responsive to an application of a second one of the electrical signals for impressing upon said second input terminal a signal proportional to the product of the output signal and the second signal when the first signal is applied to said first input terminal; and means coupling said multiplier means and said generator means for providing said application.

26. The apparatus according to claim 25, above, further including means for disconnecting said multiplier means from said feedback path during said application.

References Cited

UNITED STATES PATENTS 3,298,275   1/1967   Du Bois et al.

RONALD L. WIBERT, Primary Examiner

V. P. McGRAW, Assistant Examiner

U.S. Cl. X.R.

250—226; 356—86

PO-1050
(5/69)

UNITED STATES PATENT OFFICE
CERTIFICATE OF CORRECTION

Patent No. 3,547,541            Dated December 15, 1970

Inventor(s) Veijo V. Varnela

It is certified that error appears in the above-identified patent and that said Letters Patent are hereby corrected as shown below:

Column 1, line 45, "components" should read --component--.
Column 2, line 5, "electric" should read --electrical--;
Column 2, line 35, "respetcive" should read --respective--.
Column 3, line 26, "ratios may be" should read --ratios be--
Column 3, lines 49 and 50, "output ratio" should read --outp signals proportional to the intensity ratios. There mus be a mechanical adjustment of a potentiometer for each ratio--;
Column 3, lines 60 through 62, delete "be a mechanical adjustment of a potentiometer for each signals proportional to the intensity ratios. There must".

Column 8, line 5, "FIG. 2" should read --FIG. 3--;
Column 8, line 47, "wtih" should read --with--;
Column 8, line 75, "includsion" should read --inclusion--.
Column 9, line 36, "adjusted" should read --adjuster--.
Column 10, lines 66 & 67, "advancse" should read --advance--
Column 15, line 44, "said input" should read --said second input--.

Signed and sealed this 20th day of April 1971.

(SEAL)
Attest:

EDWARD M. FLETCHER, JR.          WILLIAM E. SCHUYLER, JR.
Attesting Officer                 Commissioner of Patents